(12) United States Patent
Storck

(10) Patent No.: US 6,293,574 B1
(45) Date of Patent: Sep. 25, 2001

(54) BICYCLE FRAME

(75) Inventor: Markus Storck, Bad Camberg (DE)

(73) Assignee: Storck Bicycle GmbH (DE)

( * ) Notice: Subject to any disclaimer, the term of this patent is extended or adjusted under 35 U.S.C. 154(b) by 0 days.

(21) Appl. No.: 09/230,301

(22) PCT Filed: Jul. 22, 1997

(86) PCT No.: PCT/EP97/03959

§ 371 Date: Feb. 17, 1999

§ 102(e) Date: Feb. 17, 1999

(87) PCT Pub. No.: WO98/03390

PCT Pub. Date: Jan. 29, 1998

(30) Foreign Application Priority Data

Jul. 22, 1996 (DE) ............................................. 196 29 559

(51) Int. Cl.[7] .................................................. B62K 25/28
(52) U.S. Cl. ............................................ 280/284; 280/275
(58) Field of Search ...................................... 280/284, 283, 280/285, 286, 288, 275; 180/219

(56) References Cited

U.S. PATENT DOCUMENTS

| | | | |
|---|---|---|---|
| 4,887,829 | * 12/1989 | Prince | 280/282 |
| 5,335,929 | 8/1994 | Takagaki et al. | 280/283 |
| 5,354,085 | 10/1994 | Gally | 280/285 |
| 5,419,572 | * 5/1995 | Stiller et al. | 280/252 |
| 5,509,679 | 4/1996 | Leitner | 280/284 |
| 5,515,957 | * 5/1996 | McConaghy | 192/64 |
| 5,553,881 | 9/1996 | Klassen et al. | 280/284 |
| 5,628,524 | 5/1997 | Klassen et al. | 280/284 |
| 5,678,837 | 10/1997 | Leitner | 280/284 |

FOREIGN PATENT DOCUMENTS

| | | | |
|---|---|---|---|
| G 94 05 076.7 | 5/1994 | (DE) | B62K/3/02 |
| 0 493 773 A2 | 7/1992 | (EP) | B62K/25/30 |
| 0 574 613 A1 | 12/1993 | (EP) | B62K/25/28 |
| 0 723 907 A1 | 7/1996 | (EP) | B62K/25/28 |
| WO 93/13974 | 7/1993 | (WO) | B62K/25/28 |

OTHER PUBLICATIONS

PCT Search Report for PCT/EP97/03959.

* cited by examiner

Primary Examiner—Richard Chilcot
Assistant Examiner—Michael Cuff
(74) Attorney, Agent, or Firm—George W. Rauchfuss, Jr; Ohlandt, Greeley, Ruggiero & Perle

(57) ABSTRACT

A bicycle frame with a seat tube, whose upper end is designed to hold a seat pillar and at whose lower end is situated a bottom bracket shell, and to a pair of chainstays, which are essentially parallel to each other and at their front end are pivotally mounted at a first pivot point on the seat tube at a distance from the bottom bracket shell, and at their back end are connected with dropouts to hold a rear wheel axle. The invention also comprises a pair of essentially mutually parallel seatstays, which at one end are pivotally mounted at a second pivot point on the chainstays, this second pivot being situated in the region of the dropouts, and a rocker plate that has three rocker pivot points, that is a first rocker pivot point at which a second end of the seatstays is hinged, a second rocker pivot point at which this rocker plate is rotatably connected to the seat tube, namely in a region between the first pivot point and the upper end of the seat tube, and a third rocker pivot point which is hinged with a first end of a spring suspension device, the second end of which is fixed to the frame.

13 Claims, 5 Drawing Sheets

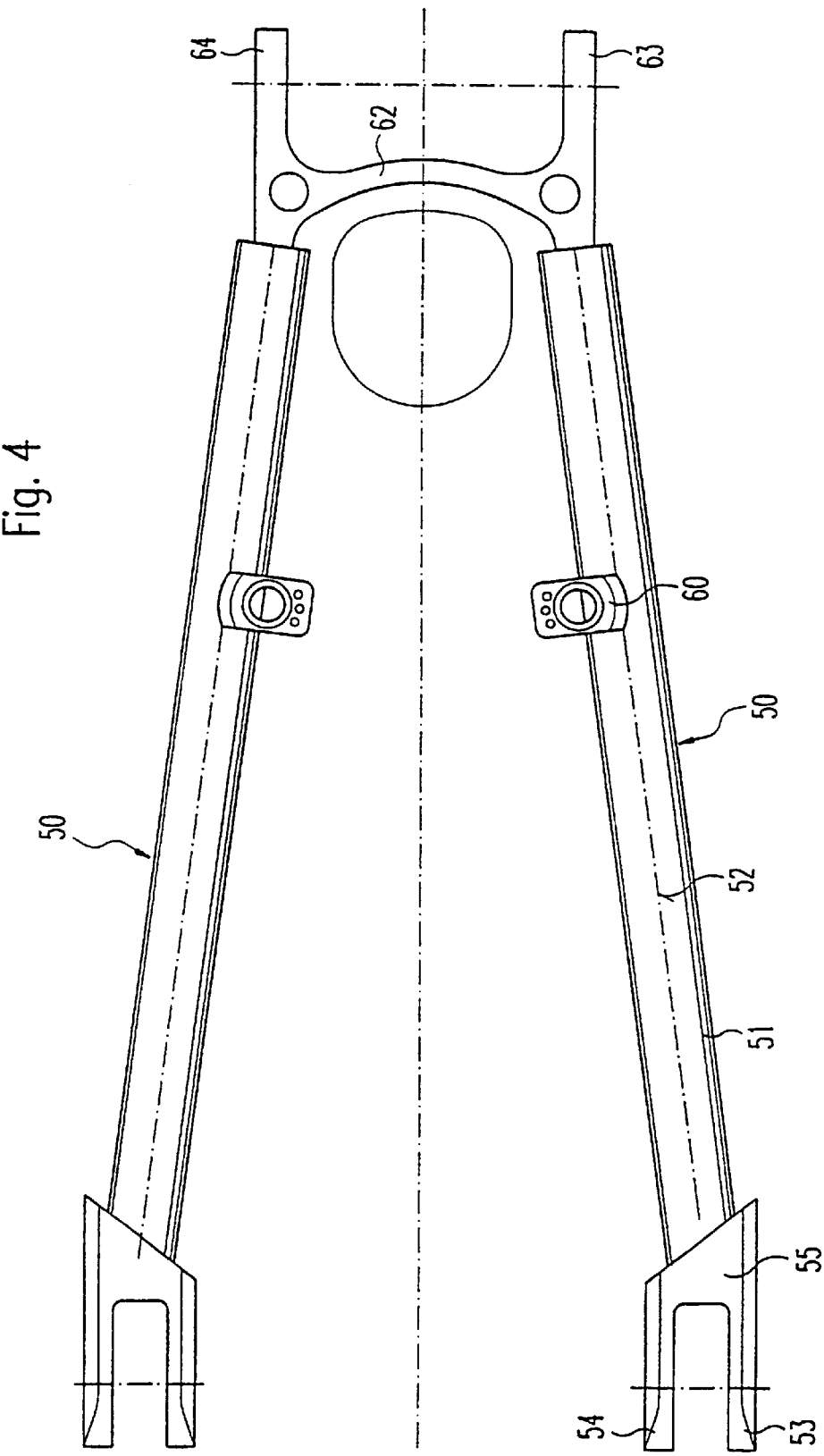

BICYCLE FRAME

Figure 1:
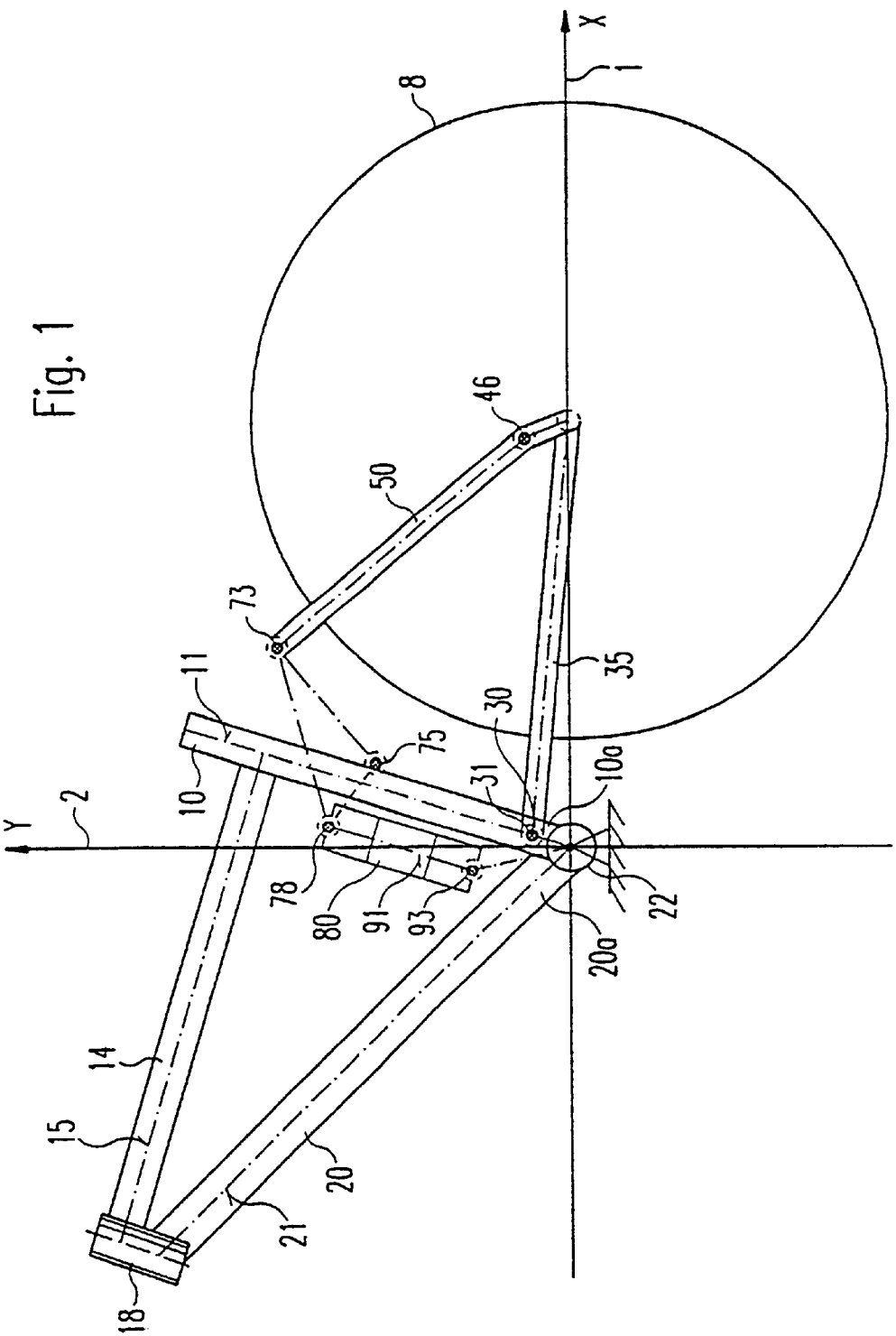

The present invention is directed to a bicycle frame, and in particular a bicycle frame in which at least the rear wheel is sprung counter to the frame.

It has been especially the development of mountain bikes which has led to an increasing demand for cushioned, resilient bicycle frames. The first step necessary in the application of resilient sprung bicycle frames was the development of front wheel suspension forks; these enable a relative movement between the front axle pivot point at the fork and the forking tube which is leading into the bicycle frame's head pipe. After the introduction of suspension forks had already yielded considerable gains in riding safety and comfort, attention increasingly turned to the development of rear wheel suspension frames.

In developing rear wheel suspension for bicycles, several design goals must be reconciled with one another. On the one hand, the entire arrangement must be very lightweight, since a heavy bicycle is unwieldy and completely useless for athletic uses. Furthermore, it must be ensured that sufficient spring deflection to prevent a bouncing or jumping of the rear wheel will be provide, even over vastly uneven terrain, as said jumping considerably impairs riding stability. In addition, the rear wheel suspension must be disposed in such a manner that it reliably guides the rear wheel, so that the stability gained through the suspension is not then lost again due to inept rear wheel guidance.

Finally, a rear wheel suspension should also be adjustably configured, in order to enable simplified adjustments in consideration of users of different weights or for different types of terrain.

It is the task of the present invention is to devise a rear wheel suspension of a type known in the state of the art, in which an especially high measure of comfort and riding safety is gained, without any detriment to the directional stability of the rear wheel.

This task is solved in accordance with the objects of the invention as claimed in claim 1.

Preferred embodiments of the invention comprise the subjects of the dependent claims.

In the bicycle frame according to the present invention, a seat tube is disposed which is open at its upper end so that a saddle stay can be inserted. A pedal bearing housing is arranged at the lower end and is preferably soldered, welded, or glued to the seat tube.

Above said pedal bearing housing and preferably as close to it as possible, a pivot point is disposed for two chain stays which are arranged and mounted to the left and right sides of the bicycle rear wheel and which are joined to a contour for receiving the rear wheel axle, preferably by means of a customary clamping arrangement.

The fulcrum of the first seat tube pivot point is preferably arranged exactly at the center line of the seat tube.

The rotational connection between the chain stays and the seat tube is preferably provided by means of roller bearings, specifically by means of needle bearings for receiving the radial force and two axial bearings for receiving the axial force.

The use of the axial bearings, preferably axial roller bearings, enables a high initial tension between the elements which are movable relative to one another, so that a narrow chain stay guidance, largely without clearance play, results at the seat tube.

The contour is preferably a independently finished component, which in each case is soldered, welded, or glued to the essentially tube-shaped chain stays.

At the contour, and in fact preferably above the receiving of the rear wheel axle, a second pivot point is disposed, whereby a pivot point is provided at each chain stay, so that an overall essentially symmetrical construction with respect to the rear wheel results.

At the contour, the pivot point is defined by a drill hole which receives the actual bearing unit. Also at this pivot point, a combination of needle bearings for receiving the radial force and axial bearings (here too, axial roller bearings in particular) for receiving the axial force are employed. Here as well, the utilization of axial roller bearings has the advantage of high initial tensioning, thereby enabling good guidance without clearance play here as well.

The second pivot point at the contour rear is the junction point between the two chain stays and the seat stay. The seat stay is rotatably joined to the contour at this second pivot point, and indirectly joined to the seat tube at a third pivot point. Indirectly not because there are no immediate connections disposed between said seat stay and said seat tube, but rather because a still to be described rocker plate is disposed for connection with the seat tube.

The connection between the seat stay and the rocker plate is made with ball joints, so that tensioning within the rear wheel structure can be prevented.

According to the present invention, the rocker plate provides three rocker plate pivot points, namely the first rocker plate pivot point as described above at which the seat stay is flexibly affixed, and a second rocker plate pivot point, at which rocker plate and seat tube are joined together. This pivot point is disposed on the seat tube, and is in fact disposed at its rear, the rear wheel side above the first pivot point.

The rocker plate has a third rocker plate pivot point at which a spring damping element is flexibly affixed to the rocker plate. Ball joints are also preferably employed here. The spring damping element is preferably parallel to and in front of the seat tube, meaning arranged counter to the rear wheel side. The spring damping element is mounting on the frame by means of a connective fitting arrangement.

The frame is preferably of conventional construction, meaning it comprises a seat tube which, as seen from the pedal bearing, slopes diagonally down to the rear wheel, a top tube, a down tube connected to the pedal bearing housing, and a head pipe, which receives the fork tube of the front wheel fork.

The fitting arrangement in this case comprises two plates connected to the seat tube and the down tube, as well as to the pedal bearing housing if necessary, and effecting an additional reinforcement.

Ball joints are preferably employed at the latter described connective points of the spring damping element with the frame as well.

The solution according to the present invention has a succession of fundamental advantages.

For the most part, the design follows the construction of known diamond frames, so that known dimensions, for example of seat tubes, remain unchanged. The continuous seat tube has the advantage that the torque transmitted through the saddle stay to the seat tube can be dispersed over a large length of the seat tube.

The arrangement has the further advantage that frame leveling adjustments during cushioning do not generally influence chain tension. The force at work in the chain, which causes tensioning between pedal bearing and rear wheel axis, has consequently only very little influence on the spring damping properties of the rear construction.

On the basis of the geometry applied and also the preferable bearing elements employed, a very rigid lateral guidance results for the rear wheel, which in turn fundamentally improves ride stability.

Last but not least, the utilization of the rocker plate allows for the mounting of the spring damping element parallel to the seat tube, which is of particular advantage for its adjustability.

The dimensions of the rear construction are independent of the frame size, provided that customary rims and tire diameters are applied. If one draws a connective line (figuratively) from the fulcrum of the pedal bearing to the fulcrum of the rear wheel and identifies this connective line as the x-axis, and then establishes a y-axis vertical to this x-axis, a Cartesian coordinate system emerges for specifying the individual pivot points, whereby the pedal bearing forms the protruding boss and the wheel pivot point according to the definition receives the y-value 0.

An especially favorable pivot point configuration, which enables an optimal damping/spring relationship for the rear construction, is to be noted with the following values, whereby the coordinates always refer to the figurative fulcrums. It is further presupposed that the coordinate section between the pedal bearing and the rear wheel axle is positive and that the coordinate section arranged to the left of the x-axis is negative.

Thereafter, the following preferred coordinate values, in mm, result:

| | | |
|---|---|---|
| Pedal bearing fulcrum | x = 0 | y = 0 |
| Rear wheel fulcrum | x = 430 | y = 0 |
| Second pivot point (contour of rear wheel) | x = 413 | y = 47 |
| Third pivot point (Connection between seat stay and rocker plate) | x = 201 | y = 300 |
| Mounting of rocker plate at seat tube | x = 86 | y = 206 |
| Connection point between rocker plate and spring damping element | x = 27 | y = 259 |
| Connection point between frame and spring damping element | x = −19 | y = 110 |
| First pivot point (Connection between seat tube and chain stays) | x = 12 | y 38 |

The above-mentioned figures represent an particularly preferred embodiment example. The figures can be moderately modified, in limited measure, for example within a range of −5 to +5 mm in the respective coordinates.

Figure 2:
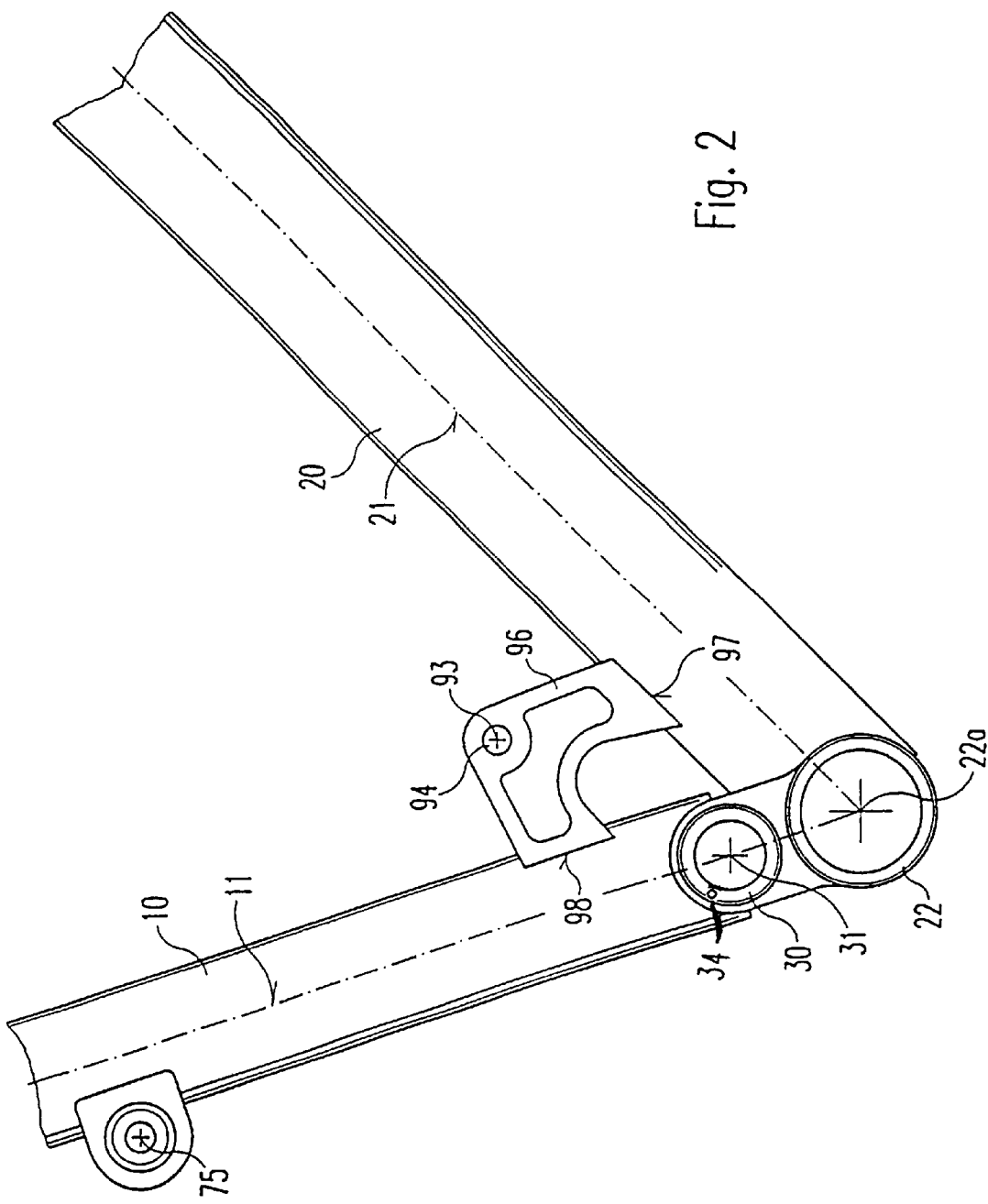
Figure 3:
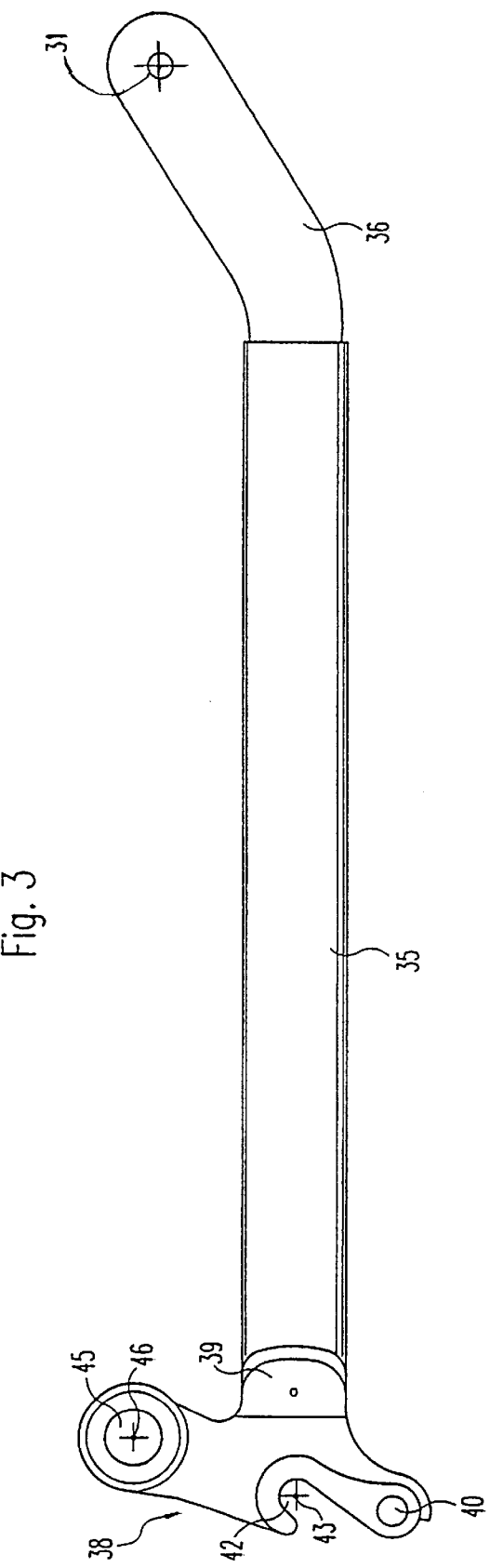
Figure 7:
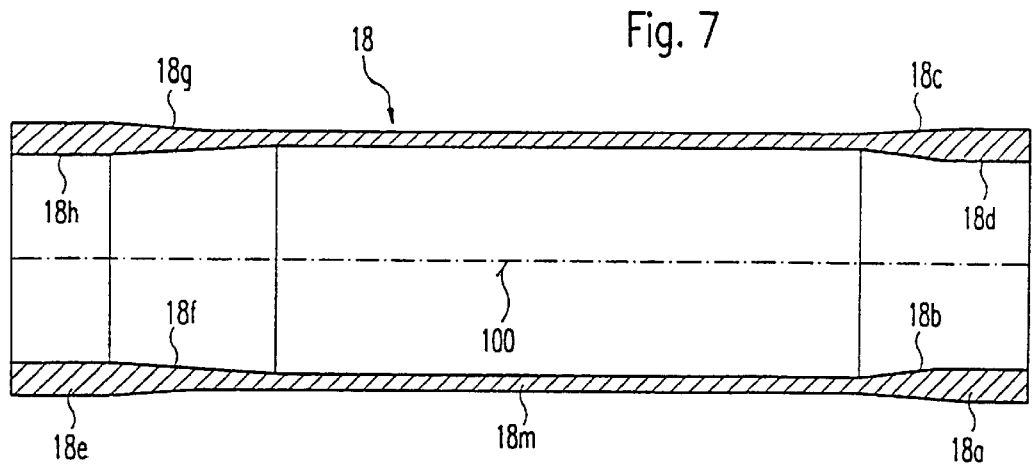
Figure 8:
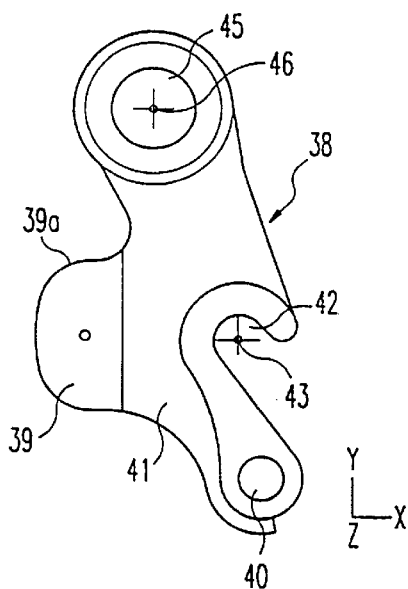
Figure 5:
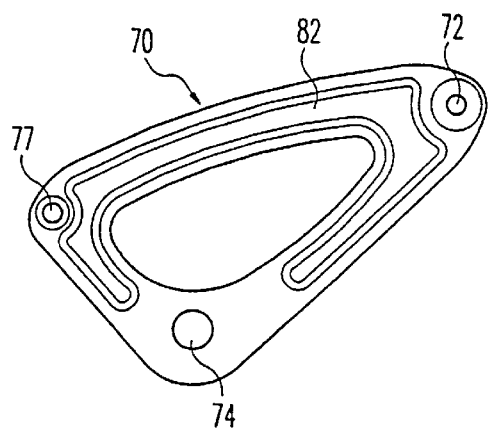
Figure 9:
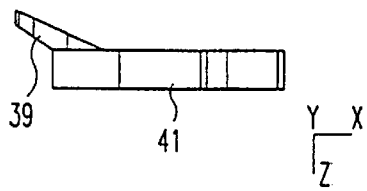
Figure 6:
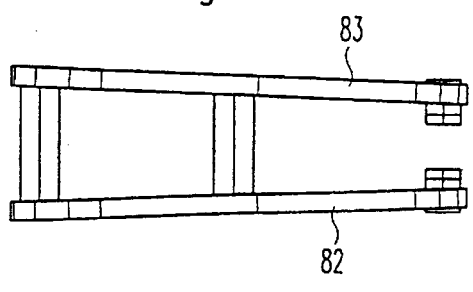

In the following, further advantages, characteristics and application possibilities on the basis of a preferred embodiment will now be described in connection with the drawings. The drawings depict:

FIG. 1 schematic side view of a mountain bike frame with the rear construction spring arrangement according to the invention;

FIG. 2 enlarged side view of the preferred embodiment in accordance with FIG. 1;

FIG. 3 schematic representation of a chain stay of the preferred embodiment in accordance with FIG. 1;

FIG. 4 schematic view of the seat stay of the preferred embodiment in accordance with FIG. 1;

FIG. 5 schematic side view of the rocker plate of the preferred embodiment in accordance with FIG. 1;

FIG. 6 view of the rocker plate according to FIG. 5;

FIG. 7 schematic sectional view through a head pipe;

FIG. 8 schematic side view of the frame contour according to the present invention;

FIG. 9 view of the contour according to FIG. 8.

A preferred embodiment of the bicycle frame according to the invention will now be described in further detail in accordance with FIG. 1.

To better represent the individual pivot points, the depicted frame is arranged about a Cartesian coordinate system in which axis 1 is shown in an essentially horizontal-oriented x-axis, and axis 2 is arranged vertically thereto in an essentially vertical-oriented y-axis.

The depicted bicycle frame consists of a seat tube 10 which s essentially cylindrical-shaped and is symmetric to a length-oriented center line 11. Said seat tube 10 is slanted approximately 65° to 75° to the horizontal, meaning that the angle between the center line 11 and the x-axis 1 corresponds roughly to this amount.

The seat tube 10 is connected essentially cylindrically with a top tube 14, which is itself essentially cylindrical and at an angle of approximately 90° to the seat tube. The top tube 14 is further connected with a head pipe 18 to which a normal front wheel fork is provided; i.e., more precisely, the fork tube receives such a front wheel fork. Preferably the head pipe 18 is provided to receive the suspension fork.

The head pipe 18 and the seat tube 10 are joined together by means of an essentially cylindrical lower tube 20, which is itself essentially cylindrical and which extends along a center line 21.

The down tube 20 and the seat tube 10 are connected at their respective lower ends 20a and 10a to an essentially cylindrical pedal bearing housing, which is tubular-shaped and with its middle axis, which simultaneously represents the fulcrum of the pedal bearing and also the coordination system zero point, extending vertically through the plane of tubes 10, 14, 20.

The lower region 20a of down tube 20 preferably deviates from the cylindrical form with actually an essentially square-shaped form having a continuous contact surface through which a larger connecting surface between the tube walls and the pedal bearing housing is generated.

The frame itself is manufactured from light metal, preferably an alloy containing soft aluminum and/or titanium. The tubes are preferably welded together and are preferably tapered. In place of an aluminum or titanium alloy, a steel frame can also be utilized; in this case, brazing is preferable for its joining.

A swivel joint 30 is provided on the seat tube 10 at the center line 11 and with a small gap to the pedal bearing housing 22. Said swivel joint 30 defines the geometric pivot point 31.

As can be seen from FIG. 2, which shows the frame in the reverse side view from FIG. 1, the pivot point 31 is arranged precisely on the center line 11 and at a small gap to said center line and fulcrum 21; in the preferred embodiment, said slight gap is approx 40 mm.

In FIG. 3, two chain stays, designated with the numeral 35, parallely rotatable to each other are affixed at said first pivot point 31. The rotatable connection 34 transpires by means of needle bearings as well as over two axial roller bearings which can receive the axial force.

The chain stay 35 shows a connection boss 36 in its forward region, through which it is joined with the swivel joint, just as at the opposite end, meaning removed from the first pivot point 31, a contour 38. Said contour shows a forward projecting boss 39, through which it is joined to the chain stay 35, and is otherwise manufactured as a unitary one-piece element. A drill hole 40 is provided, serving to receive a gear, and a recess 42 serves for receiving the axis of the rear wheel. The rear wheel axis rotates around the center of the drill hole 40; i.e., about itself vertically to the depicted plane of extended axis 43 in FIG. 3.

A drill hole 45 is disposed spaced at a distance to said axis; in this preferred embodiment, at a spacing of approximately 46 mm in direction of the y-axis. The middle axis 46 of said drill hole defines the second pivot point. Via drill hole 45, the contour 38 is joined with seat stay 50, which is shown in the FIG. 4 view.

Each of the two seat stays 50 consists of an essentially tubular-shaped body 51 which extends along a center line 52.

In each case, at the lower end of the tube, meaning counter the axis end of the rear wheel, a slew rack arrangement 55 is provided which has two tabs 53, 54 arranged parallel to another and mounted on either side of the contour 38.

The seat stays 50 are rotatably joined with drill hole 45 via the slew rack 55.

Bolts 60 are conventionally arranged on the seat stays 50, intended for receiving customary brakes, for example cantilever type brakes.

At their upper ends, said seat stays are joined together over a connection component 62 which has two connection tabs 63, 64 for joining the seat stays with a rocker plate 70. This rocker plate (see FIGS. 5 and 6) is (in the side view) essentially trangularly formed and defines, together with drill hole 72, the third pivot point 73, which is also simultaneously the first rocker plate pivot point.

A drill hole 74 defines the second rocker plate pivot point 75 through which the rocker plate is flexibly joined with the seat tube 10 and a drill hole 77 of a rocker plate pivot point 78, through which the rocker plate is joined with a spring damping element 80.

As can be seen from FIGS. 5 and 6, the rocker plate consists essentially of two shaped parts 82, 83, which are built in essentially symmetric mirror image to one another. The pivot point 75 formed by the joint 74 is, as is especially obvious in FIG. 2, arranged behind the seat tube 10 in the direction of the rear construction.

The spacing between the rocker plate pivot point on the seat tube and the pivot point 31 of the seat tube chain stays amounts to preferably approx. 180 mm, respectively the distance to the pedal bearing fulcrum approx 220 mm, when the pedal bearing axis 22a and the first pivot point are offset at 40 mm from each other.

The third rocker plate pivot point 78 is joined with a spring damping means 80 of conventional construction. This spring damping means has an external coil spring as well as an interior damping means, which works with air or oil damping.

As can be recognized in FIG. 1, the center line 91 of the spring damping means 80 is essentially parallel to the center line 11 of the seat tube 10.

The spring damping means 80 is joined with a further pivot point 93 to the frame.

This pivot point 93 is defined, as can best be seen in FIG. 2, through a drill hole 94 which has two plates 96 parallel to each other, and joined to the seat tube as well as also to the down tube. The two plates (in the side view according to FIG. 2, only one plate is recognizable) are essentially triangular in shape and have a first contact area 97, by means of which they are joined to the down tube, and a second contact area 98, by means of which they are joined to the seat tube 10. The edges of the contact areas 97, 98 are disposed approximately parallel to the respective center line 11, respectively, of the seat tube, and center line of the down tube.

As previously indicated, the connection takes place at first pivot point 30 and at second pivot point 46 by means of separate radial and axial bearings, i.e., that radial acting forces and axial acting forces are separately received. Roller bearings are utilized at both pivot points to diminish the stick-slip effect, thereby resulting in a very low frictional force so that there is no significant influence on spring dynamics.

The connections of the three rocker plate pivot points and also the connection in pivot point 93 transpires via ball joints which are individually adjusted to the respective frame, making it hereby possible to form a stress-free rear wheel suspension without sacrificing the suspension for lateral guidance stability.

The frame components of the present preferred embodiment are made wholly of an aluminum alloy, the rigid connections are welded together. In place of an aluminum alloy, other metals may also be used such as, for example, a titanium or other steel alloy.

Depending on the selected material, the connections are then no longer welded, which is also possible with an aluminum alloy, but rather brazed, or also glued.

Apart from a metal alloy, the frame may also consist of a plastic material, whereby then preferably with fiberglass or particularly carbon-fiber reinforced plastic. In these cases, the frame components are either glued together at their rigid connection points or directly joined together as a solid unitary piece during the manufacturing process.

When utilizing a metal alloy, the tubes are preferably tapered as known from the state of the art.

A special formation of the head pipe with the present preferred embodiment will now be further specified in connection with FIG. 7.

This embodiment of the head pipe 18 is intended particularly for employment with a frame as is represented in FIG. 1. It is herewith to be explicitly noted that this head pipe can also be applied to other frames and also with frames having a different rear suspension construction or no rear suspension construction, as well as to those front wheel forks having a suspension and also those which do not have such a suspension.

The head pipe depicted is essentially disposed rotatably symmetric around a rotational symmetrical line 100 and is tapered at both ends.

At its first end 18a, an essentially conical contact surface 18b is provided, through which the cylindrical form tapers inwardly.

Its outer area 18c is also provided with a conical modification as regards its diameter, specifically with an outwardly-extending diameter. Only ledge 18d is cylindrical in shape.

In a corresponding manner, a first conical contact surface 18f is provided in the interior region at the second end 18e, through which the interior diameter again narrows, and a second conical contact surface, essentially in the conical area 18g, through which the outer diameter enlarges. Also here, a cylindrical area 18h is provided.

In the center region 18m, the outer tube diameter amounts to 40 mm and the inner tube diameter to 35.6 mm.

In areas 18c and 18h, the outer diameter enlarges to 42 mm.

The cylindrical inner diameter in areas 18d and 18e is respectively 33 mm.

By this formation, a tapering is achieved that is far better adapted to the tensioning in the head pipe than the customary taperings up to this point have been.

FIGS. 8 and 9 shows a detailed view of the contour as employed in said preferred embodiment.

The contour (FIG. 8 depicts the right contour) is milled or forged and consists of a basic element 41, in which a drill hole 40 is provided for receiving the gear and a recess 42 is provided for receiving the rear axis.

An inwardly projecting boss 39 is joined as a solid piece to this basic element 41, said boss is welded to the chain stay. In the view according to FIG. 8, the boss 39 is essentially rectangularly-shaped, whereby the longer end of the rectangular side is mounted crosswise to the direction of length of the chain stay and whereby the chain stay counter the rectangular side is generously rounded.

The formation of the contour yields a high stability and a reliable connection with the chain stay, as well as also with the rear axis and with the joint.

Since the hole for receiving the wheel axis is open below towards the back, the connections are extremely reliable as regards the traction force exerted by the chain and as regards the forge exerted through the weight of the rider.

The functions of the bicycle frame according to the present invention shall now be described.

The bicycle frame is mounted in the customary manner, whereby a rear wheel 8, schematically depicted in FIG. 1, is received in the contour 38.

The frame is completed with components in the usual manner (not represented); i.e., particularly with a suspension fork whereby its fork tube is received in the head pipe 18, a front wheel arranged thereto, a front construction joined with a fork tube, handle bars connected thereto, a pedal bearing on which a pedal crank and pedals are affixed as are brakes, a cascade connection, brake grips arranged on the handlebars, etc.

The spring damping means is preferably adjustable so that it can be adapted to the weight of the rider, respectively the requirements of the terrain.

As soon as the frame is strewed by the weight of the rider, the seat tube is pushed in a downward direction to the pedal bearing and the rear wheel reception point of the contour is pushed upward according to the drawing in FIG. 1.

The adjustment of the spring damping element 80 transpires in such a manner that the desired tensioning will be initiated upon introduction of rider weight.

If, due to dynamics of motion, the acting force of rider weight diminishes on the chain and seat stays, the spring damping means is relieved and the rear wheel pivot point is pushed downward, as in FIG. 1. In this way, contact between the rear wheel and the road is guaranteed even in situations of poor road surfaces.

The intermittent joint stress acting on the rear wheel results in the rear wheel being pushed upward. The rear wheel pivot point thereby experiences an upward movement which, like the downward movement, transpires in an orbital (branch line) about the pivot point 31. The upward movement is transferred to the rocker plate by means of pivot point 46 and pivot point 73. The rocker plate thereby rotates counter-clockwise (represented in accordance with FIG. 1), stressing the spring damping element.

By means of the above-mentioned specific geometrical rendition of the frame, the rear wheel suspension achieves an exemplary and exceptionally comfortable response to road unevenness. At the same time, the geometry on one hand, and the bearings as employed on the other hand, assure a stable guidance of the rear wheel.

What is claimed is:

1. A bicycle frame comprising:
    a seat tube, disposed at its upper end to receive a seat stay and arranged with a pedal bearing housing at its lower end,
    a pair of chain stays disposed essentially parallel to each other, rotatably joined respectively at their forward ends to a first pivot point arranged at said seat tube at a predetermined gap spacing to said pedal bearing housing and disposed above said pedal housing, and joined at their rearward ends to a contour for receiving of a rear wheel axis,
    a pair of seat stays disposed essentially parallel to each other, rotatably joined respectively at their first ends to a second pivot point arranged at said chain stay and disposed above the receiving of the rear wheel axis, whereby said second pivot point is disposed in the region of said contour,
    a rocker plate provided with three rocker plate pivot points, namely a first rocker plate pivot point at which a second end of said seat stay is respectively joined,
    a second rocker plate pivot point to which said seat tube is rotatably joined, and specifically in a region lying between said first pivot point and said seat tube upper end,
    a third rocker plate pivot point, flexibly connected to a first end of a spring damping arrangement arranged essentially parallel to said seat tube, whereby a second end of the spring damping arrangement is fixed on said frame,
    wherein the first pivot point as regards a reference plane of the pedal bearing axis and a fulcrum intersecting in the contour receiving the rear wheel, has in its stable condition, a measured gap of approximately 12 mm from the pedal bearing fulcrum parallel to said reference plane and a measured gap distance of approximately 38 mm vertical to this reference plane,
    wherein in said stable condition, the gap distance between said second pivot point to said pedal bearing axis amounts to approximately 413 mm parallel to said reference plane and approximately 47 mm vertical to said reference plane,
    wherein in said stable condition, the gap distance between said third pivot point and said first rocker plate pivot point to said pedal bearing axis parallel to said reference plane amounts to approximately 201 mm and approximately 300 mm vertical to said reference plane,
    wherein in said stable condition, the gap distance between said second rocker plate pivot point to said pedal bearing axis parallel to said reference plane amounts to approximately 86 mm and approximately 205 mm vertical to said reference plane, and
    wherein in said stable condition, the gap distance between said third rocker plate pivot point to said pedal bearing axis parallel to said reference plane amounts to approximately 19 mm in a direction counter to said rear wheel pivot point and approximately 110 mm vertical to said reference plane.

2. A bicycle frame according to claim 1, characterized in that said predetermined gap spacing amounts to between 35 mm and 45 mm.

3. A bicycle frame according to claim 2, characterized in that said first pivot point is disposed essentially in the region of a center line of said seat tube.

4. A bicycle frame according to claim 1, characterized in that a needle bearing is provided for the transmission of radial force in at least one of said pivot points.

5. A bicycle frame according to claim 1, characterized in that an axial roller bearing is provided in at least one of said pivot points.

6. A bicycle frame according to claim 1, characterized in that a ball joint is provided in at least one of said pivot points.

7. A bicycle frame according to claim 1, characterized in that said spring damping arrangement is disposed in essentially cylindrical shape, whereby a coil spring is provided as the spring arrangement.

8. A bicycle frame according to claim 1, characterized in that said predetermined gap spacing amounts to between 20 mm and 60 mm.

9. A bicycle frame according to claim 1, characterized in that a fitting arrangement is provided which is joined at least to said seat tube and which is arranged on said second end of said spring damping arrangement.

10. A bicycle frame according to claim 1, characterized in that said seat tube is joined to a down tube in the region of said pedal bearing housing.

11. A bicycle frame according to claim 9, characterized in that said fitting arrangement is affixed to said seat tube as well as to said down tube.

12. A bicycle frame according to claim 11, characterized in that said fitting arrangement is provided with two parallel plates.

13. A bicycle frame according to claim 1, characterized in that said predetermined gap spacing amounts to between 30 mm and 50 mm.

* * * * *